United States Patent
Dudley et al.

(10) Patent No.: US 8,577,398 B2
(45) Date of Patent: Nov. 5, 2013

(54) SYSTEM AND METHOD FOR ENHANCED CONTENT DELIVERY

(75) Inventors: William H. Dudley, Lovettsville, VA (US); Michael Timmons, San Jose, CA (US); Robert C. Lovell, Jr., Leesburg, VA (US)

(73) Assignee: Sybase 365, Inc., Reston, VA (US)

( * ) Notice: Subject to any disclaimer, the term of this patent is extended or adjusted under 35 U.S.C. 154(b) by 711 days.

(21) Appl. No.: 12/247,358

(22) Filed: Oct. 8, 2008

(65) Prior Publication Data

US 2009/0098894 A1    Apr. 16, 2009

Related U.S. Application Data

(60) Provisional application No. 60/980,261, filed on Oct. 16, 2007.

(51) Int. Cl.
*H04W 4/00* (2009.01)

(52) U.S. Cl.
USPC .......................................... 455/466; 455/414.3

(58) Field of Classification Search
USPC .............................................. 455/466, 414.3
See application file for complete search history.

(56) References Cited

U.S. PATENT DOCUMENTS

| 7,269,664 | B2 | 9/2007 | Hutsch et al. | |
|---|---|---|---|---|
| 2003/0073450 | A1* | 4/2003 | Laumen et al. | 455/466 |
| 2003/0233329 | A1 | 12/2003 | Laraki et al. | |
| 2004/0181550 | A1 | 9/2004 | Warsta et al. | |
| 2004/0203939 | A1* | 10/2004 | Li et al. | 455/466 |
| 2005/0014489 | A1 | 1/2005 | Zhigang | |
| 2005/0143136 | A1* | 6/2005 | Lev et al. | 455/566 |
| 2006/0149630 | A1 | 7/2006 | Elliott et al. | |
| 2006/0150098 | A1* | 7/2006 | Ma | 715/542 |
| 2007/0088838 | A1 | 4/2007 | Levkovitz et al. | |
| 2008/0268882 | A1* | 10/2008 | Moloney | 455/466 |

FOREIGN PATENT DOCUMENTS

CN    101027666 A    8/2007

OTHER PUBLICATIONS

Supplementary European Search Report, EP08840260, Feb. 21, 2011, 6 pages.
European Communication EP08840260.7, Oct. 17, 2011, 5 pages.
Chinese Third Office Action issued Apr. 1, 2013, 9 pages.

* cited by examiner

*Primary Examiner* — Ariel Balaoing
(74) *Attorney, Agent, or Firm* — Edell, Shapiro & Finnan, LLC

(57) ABSTRACT

Coincident with the evolution, maturation, etc. of wireless messaging ecosystems an infrastructure that provides for enhanced content delivery in new and creative ways. The delivery model leverages the features, capabilities, etc. that are offered by MMS to deliver various types of content (e.g., content that would otherwise be difficult or impossible to display on a wireless device using the wireless device's native facilities) to wireless devices by, possibly inter alia, processing the content (including, possibly among other steps, formatting the content, rendering the content as one or more images, etc.) and subsequently delivering the processed content to a wireless device via MMS. The infrastructure may optionally leverage the capabilities of a centrally-located Messaging Inter-Carrier Vendor.

29 Claims, 6 Drawing Sheets

FIG. 6

602 — Korean

모든 인간은 태어날 때부터 자유로우며 그 존엄과 권리에 있어 동등하다. 인간은 천부적으로 이성과 양심을 부여받았으며 서로 형제애의 정신으로 행동하여야 한다.

604 — Japanese

このウェブページ、またはEA によるスポンサーリーフする任意他社品への言及及び、高齢者事務局、はじめ、そのスタッフによる承認や推奨で はありません。サーバーから参照された「オブライドウェブページの内容に対する責任を負うものとしません。

606 — Chinese

你作为非美国公民被捕或受到拘留时，有权在自愿情况下要求我们通知你本国驻美国领事官员代表。你本国领事官员可能有能力帮助你得到法律补助，通知你的家人以及到拘留所探访你等等。如

608 — Mathematical Formula

$$Str.\#.\delta_i = c_{e|W_l} \left( \sum_j \sigma_j^i(r) B_r \right)$$
$$- \int_{t_0}^{t^*} \int_{z_k} \sum_j \sigma_j^i(r) I_j(r)(z_R, \phi^j, \theta_A, e_{r,i}) \frac{du_{i\#} d\sigma_i*}{dr}$$

610 — Arabic

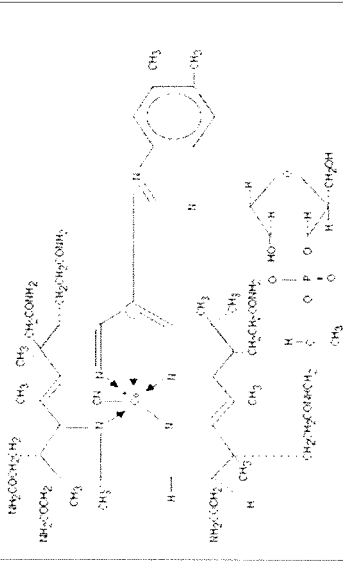

612 — Chemical Formula

US 8,577,398 B2

SYSTEM AND METHOD FOR ENHANCED CONTENT DELIVERY

This application claims the benefit of U.S. Provisional Patent Application No. 60/980,261, filed on Oct. 16, 2007, which is herein incorporated by reference in its entirety.

BACKGROUND

1. Field of the Invention

The present invention relates generally to telecommunications services. More particularly, the present invention relates to capabilities that enhance substantially the value and usefulness of various messaging paradigms including, inter alia, Short Message Service (SMS), Multimedia Message Service (MMS).

2. Background of the Invention

As the 'wireless revolution' continues to march forward the importance to a Mobile Subscriber (MS), for example a user of a Wireless Device (WD) such as a mobile telephone, a BlackBerry, etc. that is serviced by a Wireless Carrier (WC), of their WD grows substantially.

One consequence of such a growing importance is the resulting ubiquitous nature of WDs—i.e., MSs carry them at almost all times and use them for an ever-increasing range of activities.

Coincident with the expanding presence of WDs has been the explosive growth of:

1) Content—both structured and unstructured on or within, possibly inter alia, all of the different information, entertainment, etc. sites that are available on the World Wide Web (WWW); WWW Logs (blogs); social networking facilities; etc.

2) Messaging—a steady annual increase, year over year, in the number of (SMS, MMS, etc.) messages that have been exchanged by and between WDs. That steady increase shows no sign of abating. For example, as reported by the industry group CTIA (see www.ctia.org) in the U.S. there were over 158 billion SMS messages sent during 2006 (representing a 95% increase over 2005) and there were over 2.7 billion MMS messages sent during 2006 (representing a 100% increase over 2005).

Under various circumstances it may be difficult, or even impossible, to display some types of content on a WD using the WD's native (e.g., E-Mail, SMS, Instant Messaging [IM], etc.) facilities. Examples of such content might include, possibly inter alia, languages that support or require double-byte characters (such as Japanese, Chinese, Korean, Arabic, etc.), mathematical equations, scientific equations, chemical formulas, etc. Several illustrative examples of such content are presented under FIG. 6 and reference numeral 600.

The specific examples that were described above are illustrative only and it will be readily apparent to one of ordinary skill in the relevant art that numerous other examples are easily possible and indeed are fully within the scope of the present invention.

For such types of content it would be desirable to leverage the features, capabilities, etc. that are offered by MMS to be able to deliver such content to WDs by, possibly inter alia, processing the content (including, possibly among other steps, formatting the content, rendering the content as one or more images, etc.) and subsequently delivering the processed content to a WD via MMS.

The present invention facilitates such enhanced content delivery capabilities and addresses various of the (not insubstantial) infrastructure, etc. challenges that are associated with same.

SUMMARY OF THE INVENTION

In one embodiment of the present invention there is provided a method for delivering content, including receiving from a mobile subscriber a content request, said content request containing at least a content identifier; performing one or more processing steps including (a) retrieving content based on at least aspects of said content identifier yielding retrieved content and (b) altering at least the layout and organization of said retrieved content yielding altered content; and sending to said mobile subscriber one or more MMS messages containing at least aspects of said altered content.

In the embodiment said content request is one of an E-Mail message, a SMS message, a MMS message, or an IM message and said content identifier may be a URL.

Still in accordance with the embodiment, the method may include (1) resolving a link or a reference in said retrieved content, (2) tracking of content requests by said mobile subscriber, and (3) rendering aspects of said retrieved content as one or more images.

Still in accordance with the embodiment, the method may employ information previously supplied by said mobile subscriber.

These and other features of the embodiments of the present invention, along with their attendant advantages, will be more fully appreciated upon a reading of the following detailed description in conjunction with the associated drawings.

BRIEF DESCRIPTION OF THE DRAWINGS

The accompanying drawings, which are incorporated herein and form part of the specification, depict embodiments of the present invention and, together with the description that may be found below, further serve to illustrate among other things the principles, structure, and operation of such embodiments. Variations of these embodiments will be apparent to persons of ordinary skill in the relevant art based on the teachings contained herein.

FIG. 6 provides several illustrative examples of the types of content that may be supported by aspects of the present invention.

It should be understood that these figures depict embodiments of the invention. Variations of these embodiments will be apparent to persons skilled in the relevant art(s) based on the teachings contained herein.

DETAILED DESCRIPTION

The present invention may leverage the capabilities of a centrally-located, full-featured MICV facility. Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a description of a MICV, a summary of various of the services/ functions/etc. that may be performed by a MICV, and a discussion of the numerous advantages that arise from same.

Figure 1:
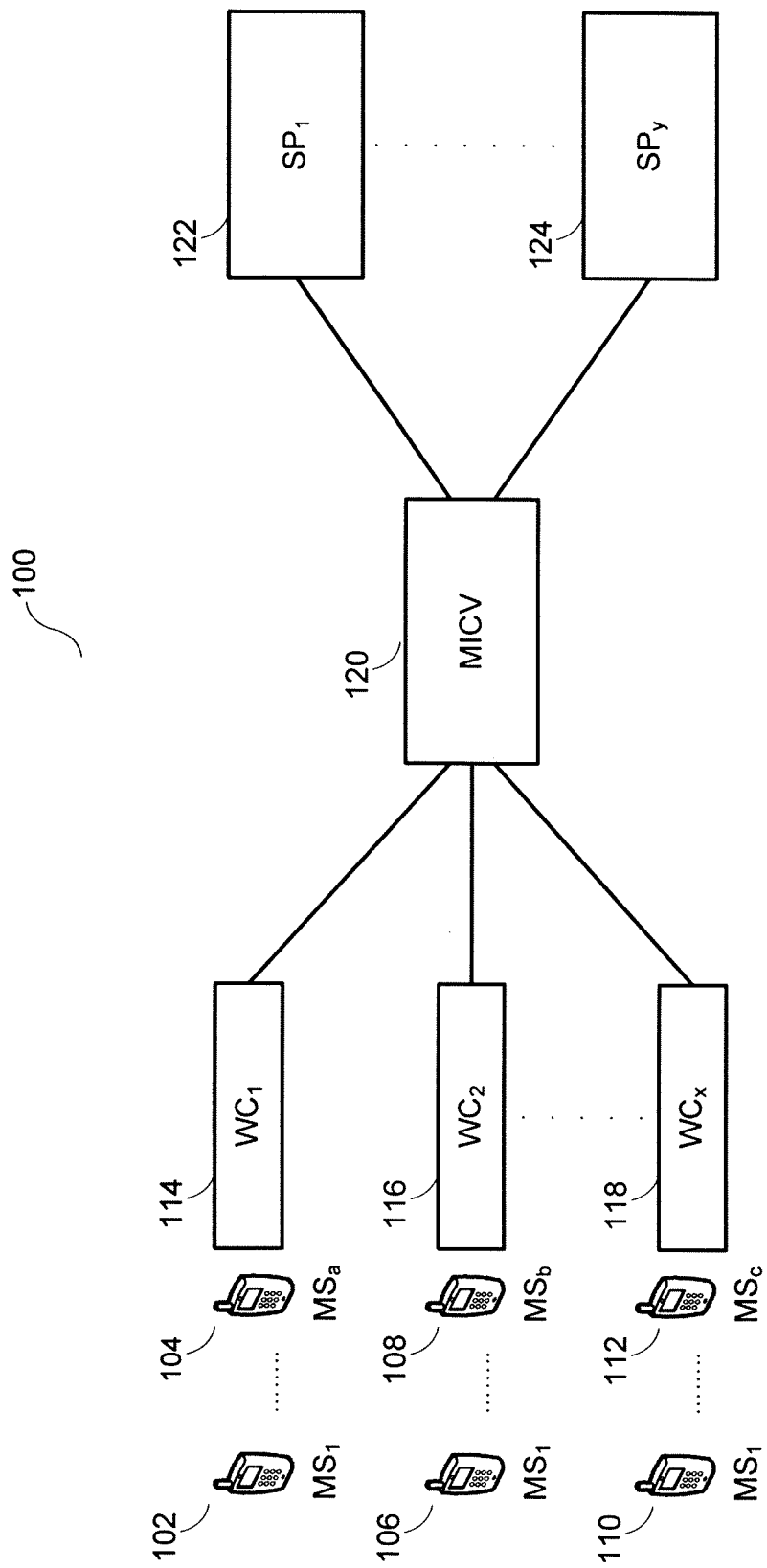
FIG. 1 is a diagrammatic presentation of an exemplary Messaging Inter-Carrier Vendor (MICV).

As illustrated in FIG. 1 and reference numeral 100 a MICV 120 is disposed between, possibly inter alia, multiple WCs (WC$_1$ 114→WC$_x$ 118) on one side and multiple SPs (SP$_1$ 122→SP$_y$ 124) on the other side and thus 'bridges' all of the connected entities. A MICV 120 thus, as one simple example, may offer various E-Mail, SMS/MMS/etc., IM, etc. message routing, formatting, delivery, value-add, etc. capabilities that provide, possibly inter alia:

1) A WC 114→118 (and, by extension, all of the MSs 102→104, 106→108, 110→112 that are serviced by the WC 114→118) with ubiquitous access to a broad universe of SPs 122→124, and 2) A SP 122→124 with ubiquitous access to a broad universe of WCs 114→118 (and, by extension, to all of the MSs 102→104, 106→108, 110→112 that are serviced by the WCs 114→118).

Generally speaking a MICV may have varying degrees of visibility (e.g., access, etc.) to the MS←→MS, MS←→SP, etc. messaging traffic:

1) A WC may elect to route just their out-of-network messaging traffic to a MICV. Under this approach the MICV would have visibility (e.g., access, etc.) to just the portion of the WC's messaging traffic that was directed to the MICV by the WC.

2) A WC may elect to route all of their messaging traffic to a MICV. The MICV may, possibly among other things, subsequently return to the WC that portion of the messaging traffic that belongs to (i.e., that is destined for a MS of) the WC. Under this approach the MICV would have visibility (e.g., access, etc.) to all of the WC's messaging traffic.

While the discussion below will include a MICV, it will be readily apparent to one of ordinary skill in the relevant art that other arrangements are equally applicable and indeed are fully within the scope of the present invention.

In the discussion below the present invention is described and illustrated as being offered by a SP. A SP may, for example, be realized as a third-party service bureau, an element of a WC or a landline carrier, an element of a MICV, multiple third-party entities working together, etc.

In the discussion below reference is made to messages that are sent, for example, between a MS and a SP. As set forth below, a given 'message' sent between a MS and a SP may actually comprise a series of steps in which the message is received, forwarded and routed between different entities, including possibly inter alia a MS, a WC, a MICV, and a SP. Thus, unless otherwise indicated, it will be understood that reference to a particular message generally includes that particular message as conveyed at any stage between an origination source, such as for example a MS, and an end receiver, such as for example a SP. As such, reference to a particular message generally includes a series of related communications between, for example, a MS and a WC; a WC and a MICV; a MICV and a SP; etc. The series of related communications may, in general, contain substantially the same information, or information may be added or subtracted in different communications that nevertheless may be generally referred to as a same message. To aid in clarity, a particular message, whether undergoing changes or not, is referred to by different reference numbers at different stages between a source and an endpoint of the message.

To better understand the particulars of the present invention consider for a moment a simple hypothetical example—SP SP$_x$ offers a service that has been enhanced or augmented as provided through aspects of the instant invention and Mary, a MS, uses SP$_x$'s service.

Figure 2:
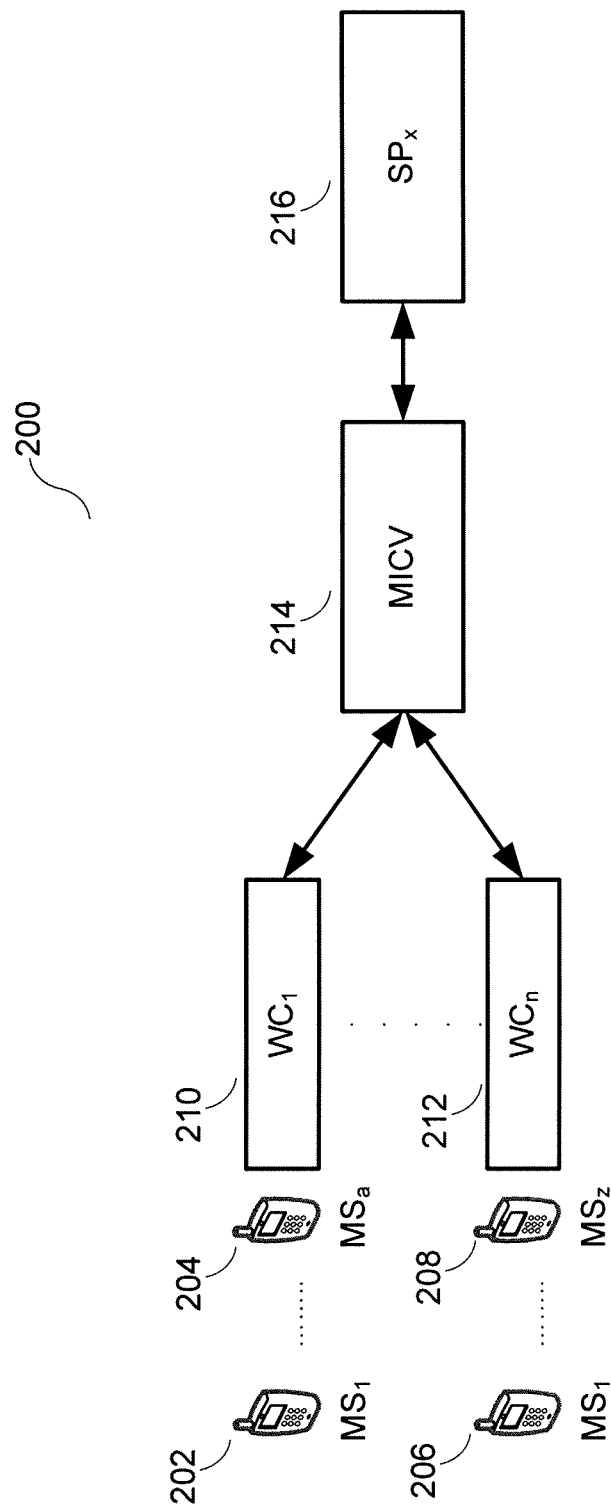
FIG. 2 illustrates one particular arrangement that is possible through aspects of the present invention.

FIG. 2 and reference numeral 200 depict one particular arrangement that may be possible under our hypothetical example. As the diagram portrays, all of the E-Mail, SMS/MMS/etc., IM, etc. messaging traffic of numerous MSs (MS$_1$ 202→MS$_a$ 204 and MS$_1$ 206→MS$_z$ 208, including Mary), is exchanged with a MICV 214 and the MICV 214 is connected with SP$_x$ 216 (a SP that offers, possibly inter alia, aspects of the present invention).

Figure 3:
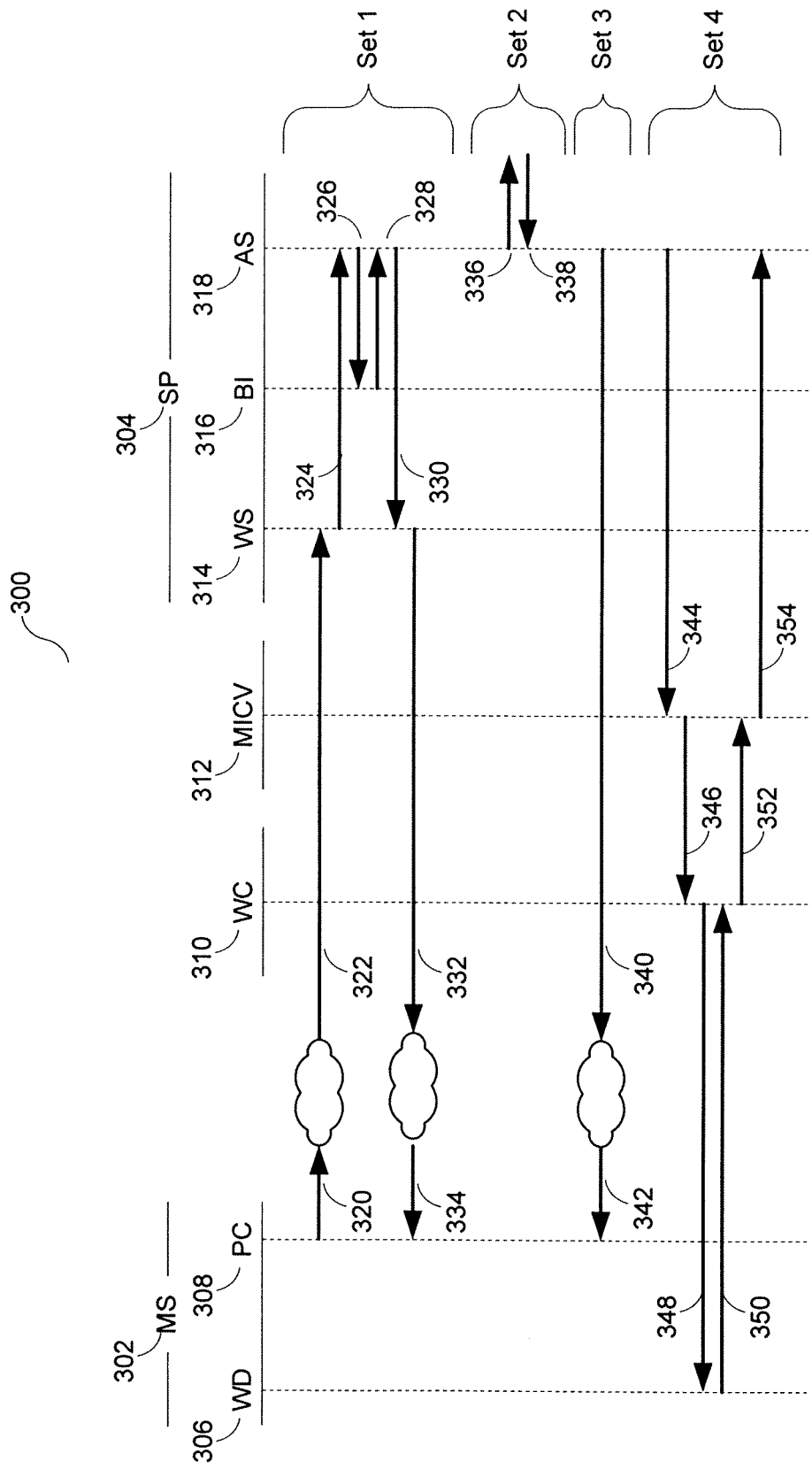
FIG. 3 illustrates various of the exchanges or interactions that are possible during an optional registration portion of the present invention.

FIG. 3 and reference numeral 300 illustrate various of the exchanges or interactions that might occur under an optional registration portion of our hypothetical example. Among other things a registration process may be tailored (e.g., the range of information gathered, the scope of services subsequently offered, etc.) to the class of user—e.g., possibly inter alia different types, categories, etc. of users may complete different registration processes. Of interest and note in the diagram are the following entities:

MS 302 WD 306. For example, Mary's 302 WD such as mobile telephone, BlackBerry, PalmPilot, etc.

MS 302 Personal Computer (PC) 308. For example, one of Mary's 302 home, work, etc. PCs.

WC 310. The provider of service for Mary's 302 WD 306.

MICV 312. As noted above the use of a MICV, although not required, provides significant advantages.

SP 304 Web Server (WS) 314. A publicly-available WWW site that is optionally provided by SP$_x$ 304.

SP 304 Billing Interface (BI) 316. A single, consolidated interface that SP$_x$ 304 may use to easily reach, inter alia, one or more external entities such as a credit card or debit card clearinghouse, a carrier billing system, a service bureau that provides access to multiple carrier billing systems, etc.

SP 304 AS 318. Facilities that provide key elements of the instant invention (which will be described below).

It is important to note that while in FIG. 3 the MS 302 WD 306 and MS 302 PC 308 entities are illustrated as being adjacent or otherwise near each other, in actual practice the entities may, for example, be physically located anywhere.

In FIG. 3 the exchanges that are collected under the designation Set 1 represent the activities that might take place as Mary 302 completes a registration process with SP$_x$ 304:

A) Mary 302 uses one of her PCs 308 to visit SP$_x$'s 304 WS 314 to, possibly among other things, complete a service registration process (320→322).

B) SP$_x$'s 304 WS 314 interacts with SP$_x$'s 304 AS 318 to, possibly among other things, commit some or all of the information that Mary 302 provided to a data repository (e.g., a database), optionally complete a billing transaction, etc. (324).

C) As appropriate and as required a BI 316 completes a billing transaction (326→328).

D) SP$_x$'s 304 WS 314 responds appropriately (e.g., with the presentation of a confirmation message, etc.) (332→334).

The specific exchanges that were described above (as residing under the designation Set 1) are illustrative only and it will be readily apparent to one of ordinary skill in the relevant art that numerous other exchanges are easily possible and indeed are fully within the scope of the present invention. For example, the collected information may be reviewed, confirmed, etc. through one or more manual and/or automatic mechanisms. For example, the registration process may be completed through any combination of one or more channels including, inter alia, the WWW (via, for example, a Web site that is operated by SP$_x$ 304), wireless messaging (SMS, MMS, etc.), E-Mail messages, IM, conventional mail, telephone, Interactive Voice Response (IVR) facility, etc.

During the registration process described above a range of information may be captured from a MS including, inter alia:

A) Identifying Information. For example, possibly among other things, name, address, landline and wireless Telephone Numbers (TNs), E-Mail addresses, IM names/identifiers, a unique identifier and a password, etc.

B) Personal Information. For example, the particulars of a MS' WD(s) (including, possibly inter alia, TN, manufacturer, model number, features and capabilities, limitations, etc.); the types of content of interest to a MS and the particulars (including, possibly inter alia, the location, format, etc.) for same; various lists, catalogs, etc. of content (that, possibly inter alia, a MS may subsequently 'quick pick/select' on their WD); etc.

C) Billing Information. Different service billing models may be offered including, inter alia, a fixed one-time charge, a recurring (monthly, etc.) fixed charge, a recurring (monthly, etc.) variable charge, a per-event charge, etc. Different payment mechanisms may be supported including, possibly among other things, credit or debit card information, authorization to place a charge on a MS's phone bill, authorization to deduct funds from a MS' (bank, brokerage, etc.) account, etc.

D) Other Information. Additional, possibly optional, information such as, for example, further Identifying Information; further Personal Information; etc.

The specific pieces of information that were described above are illustrative only and it will be readily apparent to one of ordinary skill in the relevant art that numerous other pieces of information (e.g., scheduled daily/weekly/etc. reporting desired and/or on-demand reporting desired, etc.) are easily possible and indeed are fully within the scope of the present invention.

As noted above the information that Mary provided during the registration process may be preserved in a data repository (e.g., a database) and may optionally be organized as a MS Profile.

The content of Mary's profile may be augmented by $SP_x$ to include, as just a few examples of the many possibilities, internal and/or external demographic, psychographic, sociological, etc. data.

As noted above, a SP's BI may optionally complete a billing transaction. The billing transaction may take any number of forms and may involve different external entities (e.g., a WC's billing system, a carrier billing system service bureau, a credit or debit card clearinghouse, a financial institution, etc.). The billing transaction may include, possibly inter alia:

1) The appearance of a line item charge on the bill or statement that a MS receives from her WC. Exemplary mechanics and logistics associated with this approach are described in pending U.S. patent application Ser. No. 10/837, 695 entitled "SYSTEM AND METHOD FOR BILLING AUGMENTATION." Other ways of completing or performing line item billing are easily implemented by those skilled in the art.

2) The charging of a credit card or the debiting of a debit card.

3) The (electronic, etc.) transfer of funds.

4) The generation of an invoice, account statement, etc.

In FIG. 3 the exchanges that are collected under the designation Set 2 represent the activities that might take place as $SP_x$ 304 optionally coordinates, etc. with one or more external entities to, possibly among other things, secure access, confirm collected information, arrange to receive updates, etc. (see 336→338).

The specific exchanges that were described above (as residing under the designation Set 2) are illustrative only and it will be readily apparent to one of ordinary skill in the relevant art that numerous other exchanges (including, inter alia, updates to various of the information in a MS Profile in a SP's repository, etc.) are easily possible and indeed are fully within the scope of the present invention.

In FIG. 3 the exchanges that are collected under the designation Set 3 represent the activities that might take place as $SP_x$'s 304 AS 318 dispatches to Mary 302 one or more confirmation E-Mail, IM, etc. messages (340→342).

The specific exchanges that were described above (as residing under the designation Set 3) are illustrative only and it will be readily apparent to one of ordinary skill in the relevant art that numerous other exchanges are easily possible and indeed are fully within the scope of the present invention.

In FIG. 3 the exchanges that are collected under the designation Set 4 represent the activities that might take place as $SP_x$'s 304 AS 318 dispatches one or more confirmation SMS/MMS/etc., IM, etc. messages to Mary's 302 WD 306 (344→348) and Mary 302 optionally replies or responds to the message(s) (350→354). Of interest and note are:

1) In the instant example the messages are shown traversing a MICV 312.

2) The SP 304 may employ a Short Code (SC) or a regular TN as its source address (and to which it would ask users of its service to direct any reply messages). While the abbreviated length of a SC (e.g., five digits for a SC administered by Neustar uder the Common Short Code [CSC] program) incrementally enhances the experience of a MS 302 (e.g., the MS 302 need remember and enter only a few digits as the destination address of a reply message) it also, by definition, constrains the universe of available SCs thereby causing each individual SC to be a limited or scarce resource and raising a number of SC/CSC management, etc. issues. A description of a common (i.e., universal) short code environment may be found in pending U.S. patent application Ser. No. 10/742,764 entitled "UNIVERSAL SHORT CODE ADMINISTRATION FACILITY."

The specific exchanges that were described above (as residing under the designation Set 4) are illustrative only and it will be readily apparent to one of ordinary skill in the relevant art that numerous other exchanges are easily possible and indeed are fully within the scope of the present invention.

The Set 1, Set 2, Set 3, and Set 4 exchanges that were described above are illustrative only and it will be readily apparent to one of ordinary skill in the relevant art that numerous other exchanges are easily possible and indeed are fully within the scope of the present invention. For example, possibly inter alia, the registration information that was described above may subsequently be managed (e.g., existing information may be edited or removed, new information may be added, etc.) through any combination of one or more channels including, inter alia, a SP's WWW facility, wireless messaging (SMS, MMS, etc.), E-Mail messages, IM exchanges, conventional mail, telephone, IVR facilities, etc.

To continue with our hypothetical example . . . as Mary goes about her daily tasks occasions will arise where she will want to secure, and subsequently examine, content on her WD but one or more circumstances may preclude same. Such circumstances may include, possibly inter alia, combinations of the nature of the content (e.g., considering the illustrative examples that are presented under FIG. 6 and reference numeral 600 portions of the content might be written in a language such as Korean 602, Japanese 604, Chinese 606, Arabic 610, etc. that supports or requires double-byte characters; portions of the content might include mathematical 608, scientific, etc. equations; portions of the content might include chemical formulas 612; etc.), the native capabilities of her WD, etc. For purposes of illustration consider the following (by no means exhaustive catalog of) examples:

1) Mary may wish to view on her WD a WWW page but her WD may not contain a browser component through which a WWW page may be requested, received, and then viewed. Alternatively, the features/functions that are offered by her WD's browser component may make the viewing of the material that is on the requested WWW page(s) impossible, difficult, time consuming, etc.

2) Mary's physical location may limit the level, type, etc. of WC-supplied service that her WD may enjoy and thus, possibly inter alia, constrain her ability to fully use her WD's native facilities for the retrieval and display of (all or perhaps just some types of) content.

The specific examples that were cataloged above are illustrative only and it will be readily apparent to one of ordinary skill in the relevant art that numerous other examples are easily possible and indeed are fully within the scope of the present invention.

Under the sort of circumstances that were cataloged above, and other circumstances that would be readily apparent to one of ordinary skill in the relevant art, Mary might employ an alternate content delivery channel. Such a channel might leverage, possibly inter alia, the features and capabilities of MMS.

Figure 4:
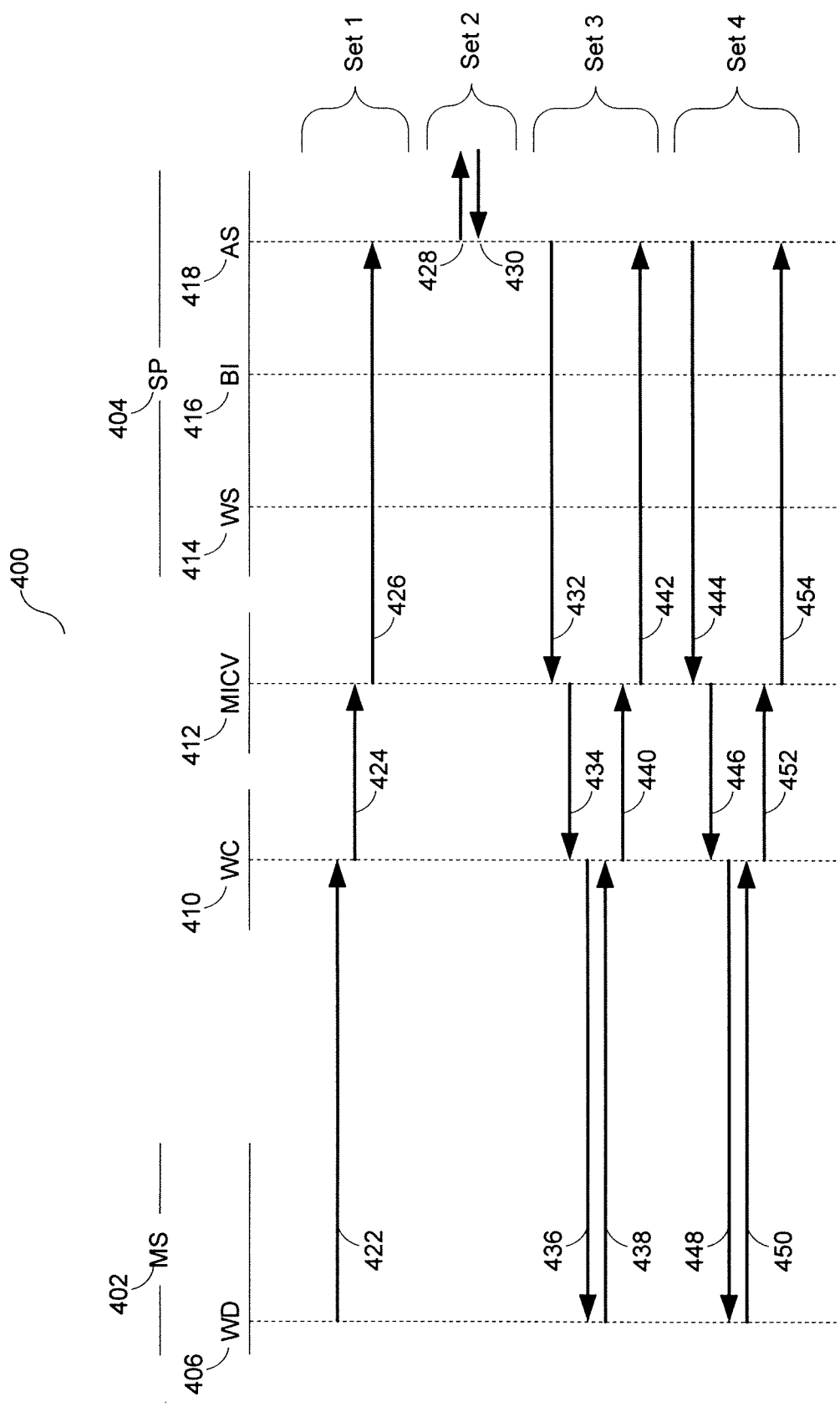
FIG. 4 illustrates various of the exchanges or interactions that are supported by aspects of the present invention.

FIG. 4 and reference numeral 400 provide a framework within which such an alternate content retrieval channel may be examined vis-à-vis aspects of the present invention. The entities that are depicted in FIG. 4 are the same as were depicted in, and described for, FIG. 3.

In FIG. 4 the exchanges that are collected under the designation Set 1 represent the activities that might take place as Mary 402 composes a content request 422 and that request is dispatched to, ultimately, $SP_x$ 404 (424→426).

A content request 422 may consist of, possibly inter alia, any combination of one or more of E-Mail message(s), SMS/MMS/etc. message(s), IM message(s), etc. Accordingly an AS 418 within a SP 404 may optionally contain a gateway component that supports, possibly among other things, such communication paradigms (i.e., E-Mail, SMS/MMS/etc., IM, etc.).

A content request 422 may be addressed using a scheme or model that is appropriate to the communication paradigms. For example, for an E-Mail message-based request an E-Mail address may be employed; for a SMS message-based request a TN, SC, etc. may be employed; etc.

A content request 422 may contain, possibly inter alia, an identifier for the content of interest—e.g., a URL of a WWW page, etc.

The specific exchanges that were described above (as residing under the designation Set 1) are illustrative only and it will be readily apparent to one of ordinary skill in the relevant art that numerous other exchanges are easily possible and indeed are fully within the scope of the present invention. For example, a SP's 404 AS 418 may optionally respond to various of the received requests (with, possibly inter alia, a confirmation, a status report, etc.). For example, on their WD a MS may save some of a content request (e.g., the destination address in their address book) or all of a content request (e.g., in their out-box) for easy/quick resubmission In FIG. 4 the exchanges that are collected under the designation Set 2 represent the activities that might take place as a SP's 404 AS 418, possibly inter alia, (a) completes a series of processing steps and (b) interacts with one or more external resources (e.g., via 428→430).

During its processing steps an AS 418 may employ any combination of a number of automated (e.g., through software solutions) and/or manual (e.g., through human intervention) techniques, activities, etc., including possibly inter alia:

A) Extracting one or more data elements from a received request and optionally performing various edit, validation, etc. operations on the extracted data element(s).

B) Identifying the requested content from, possibly inter alia, the extracted data elements.

C) Retrieving the requested content from, possibly inter alia, various external (e.g., 428→430) resources and/or various internal resources.

D) Processing the retrieved content. For example, optionally re-structuring aspects of the content (such as layout, organization, etc.) to take into account possibly inter alia the small screen size, constrained keyboard, etc. of a WD. Additionally, for links, references, etc. that may be embedded in the instant content retrieving, resolving, etc. same and incorporating in to the instant content any obtained material (thus possibly inter alia obviating the MS having to traverse, navigate, etc. on their WD the potentially numerous links, references, etc.). Such operations may consider, possibly inter alia, one or more of a MS' WD parameters as may have been gathered during a registration process. As well, rendering aspects of the (possibly adjusted) content as one or more images and, possibly inter alia, incorporating those images in to one or more MMS messages (as, for example, individual images, as a single- or multi-media stream, etc.).

The catalog of processing steps that was described above is illustrative only and it will be readily apparent to one of ordinary skill in the relevant art that numerous other processing steps are easily possible and indeed are fully within the scope of the present invention.

Various of the processing steps that were described above may leverage one or more internal and/or external repositories such as, possibly inter alia, geographic data; demographic data; the Internet and possibly one or more Intranets; search engines; news reporting services; audio, video, etc. media repositories; archive services; etc.

Various of the processing steps that were described above may have associated with it, possibly inter alia, an optional set of weighting, scoring, confidence, etc. factors that may be used, either individually or together, to develop possibly among other things the desired results.

The specific exchanges that were described above (as residing under the designation Set 2) are illustrative only and it will be readily apparent to one of ordinary skill in the relevant art that numerous other exchanges are easily possible and indeed are fully within the scope of the present invention.

In FIG. 4 the exchanges that are collected under the designation Set 3 represent the activities that might take place as a SP's 404 AS 418, possibly inter alia, optionally dispatches one or more delivery MMS messages to Mary's 402 WD 406 (432→436) and Mary 402 may optionally replies or responds to the delivery message(s) (438→442). In the instant example the delivery messages are shown traversing a MICV 412. The messaging sequence 432→436 and 438→442 may be repeated any number of times.

A delivery message may contain, possibly inter alia, some or all of the requested content (as retrieved, formatted, etc. by $SP_x$ 404).

Based on any received responses (e.g., 438→442) $SP_x$ 404 may optionally complete one or more further processing steps. For example, possibly inter alia, a SP may perform additional processing, formatting, etc. operations; may secure further content and optionally perform on that content one or more of the processing, formatting, etc. operations; etc.

The specific exchanges that were described above (as residing under the designation Set 3) are illustrative only and it will be readily apparent to one of ordinary skill in the relevant art that numerous other exchanges are easily possible and indeed are fully within the scope of the present invention.

In FIG. 4 the exchanges that are collected under the designation Set 4 represent the activities that might take place as $SP_x$ 404, possibly inter alia, optionally dispatches one or more follow-up (E-Mail, SMS/MMS/etc., IM, etc.) messages to Mary's 402 WD 406 (444→448) and Mary 402 optionally replies or responds to the message(s) (450→454). In the instant example the messages are shown traversing a MICV 412. The messaging sequence 444→448 and 450→454 may be repeated any number of times.

A follow-up message may contain, possibly inter alia, one or more of a status update (such as, for example, "The content that you requested has been delivered"); a request for further information; a (customer service, etc.) TN that the MS should contact; various information that was received from a third party; etc. An SP may optionally repeat a follow-up message (possibly at various intervals, such as for example every 15 seconds) until a response is received, until the SP has dispatched a configurable number of messages, etc.

The specific exchanges that were described above (as residing under the designation Set 4) are illustrative only and it will be readily apparent to one of ordinary skill in the relevant art that numerous other exchanges are easily possible and indeed are fully within the scope of the present invention.

The Set 1, Set 2, Set 3, and Set 4 exchanges that were described above are illustrative only and it will be readily apparent to one of ordinary skill in the relevant art that numerous other exchanges are easily possible and indeed are fully within the scope of the present invention. For example, during various of the activities that were described above an SP may offer any number of other optional services, capabilities, etc. including, possibly inter alia:

1) An SP may, perhaps based on (a) a content request and (b) MS preferences as captured during a registration process, suggest additional or other content.

2) An SP may, perhaps based on (a) a content request and (b) MS preferences as captured during a registration process, automatically augment the requested content with additional or other content.

3) An SP may complete any number of billing transactions (of the type, nature, etc. described previously).

4) An SP may track various of a MS' content requests, possibly aggregate same, and possibly offer (to the MS, to third parties, etc.) discounts, rebates, surcharges, etc. based on the tracked usage.

The confirmation, request, delivery, follow-up, etc. message(s) that were described above may optionally contain an informational element—e.g., a relevant or applicable factoid, etc. The informational element may be selected statically (e.g., all generated messages are injected with the same informational text), randomly (e.g., a generated message is injected with informational text that is randomly selected from a pool of available informational text), or location-based (i.e., a generated message is injected with informational text that is selected from a pool of available informational text based on the current physical location of the recipient of the message as derived from, as one example, a Location-Based Service [LBS], Global Positioning System [GPS], etc. facility).

The confirmation, request, delivery, follow-up, etc. message(s) that were identified above may optionally contain advertising—e.g., possibly textual material if an SMS model is being utilized, possibly multimedia (images of brand logos, sound, video snippets, etc.) material if an MMS model is being utilized, etc. The advertising material may be selected statically (e.g., all generated messages are injected with the same advertising material that is, for example, selected from a pool of available material), randomly (e.g., a generated message is injected with advertising material that is, for example, randomly selected from a pool of available material), or location-based (i.e., a generated message is injected with advertising material that is, for example, selected from a pool of available material based on the current physical location of the recipient of the message as derived from, as one example, a LBS, GPS, etc. facility). Third parties (such as, for example, advertising agencies, brands, etc.) may contribute advertising material to a SP's pool of advertising material.

The confirmation, request, delivery, follow-up, etc. message(s) that were identified above may optionally contain promotional materials (e.g., still images, video clips, etc.).

Figure 5:
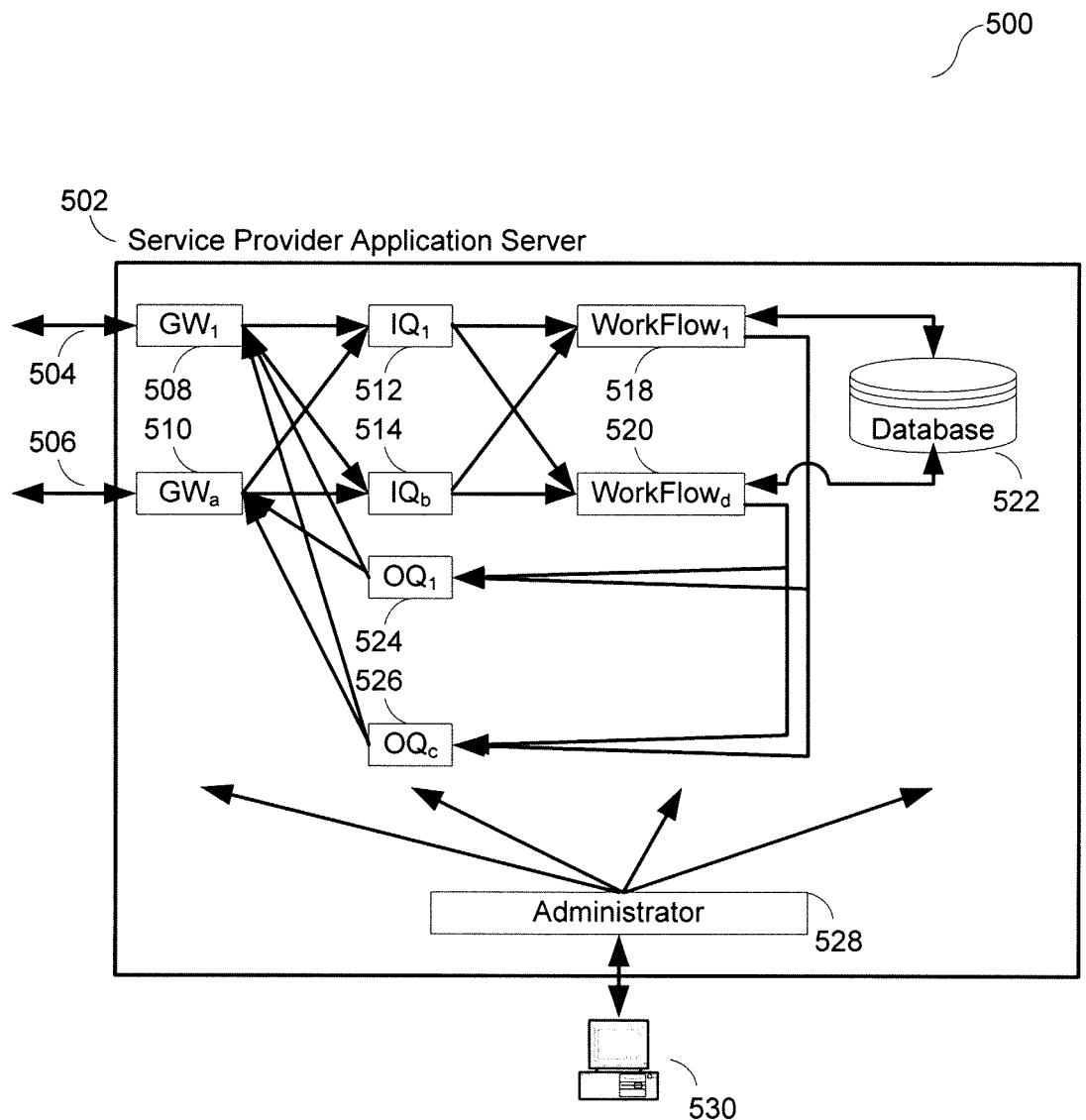
FIG. 5 is a diagrammatic presentation of aspects of an exemplary Service Provider (SP) Application Server (AS).

FIG. 5 and reference numeral 500 provides a diagrammatic presentation of aspects of an exemplary SP AS 502. The illustrated AS 502 contains several key components—Gateways ($GW_1$ 508→$GW_a$ 510 in the diagram), Incoming Queues ($IQ_1$ 512→$IQ_b$ 514 in the diagram), WorkFlows (WorkFlow$_1$ 518→WorkFlow$_d$ 520 in the diagram), Database 522, Outgoing Queues ($OQ_1$ 524→$OQ_c$ 526 in the diagram), and an Administrator 528. It will be readily apparent to one of ordinary skill in the relevant art that numerous other components are possible within an AS 502.

A dynamically updateable set of one or more Gateways ($GW_1$ 508→$GW_a$ 510 in the diagram) handle incoming (E-mail, SMS/MMS/etc., IM, etc. messaging, etc.) traffic and outgoing (E-mail, SMS/MMS/etc., IM, messaging, etc.) traffic. Incoming traffic is accepted and deposited on an intermediate or temporary Incoming Queue ($IQ_1$ 512→$IQ_b$ 514 in the diagram) for subsequent processing. Processed artifacts are removed from an intermediate or temporary Outgoing Queue ($OQ_1$ 524→$OQ_c$ 526 in the diagram) and then dispatched.

A dynamically updateable set of one or more Incoming Queues ($IQ_1$ 512→$IQ_b$ 514 in the diagram) and a dynamically updateable set of one or more Outgoing Queues ($OQ_1$ 524→$OQ_c$ 526 in the diagram) operate as intermediate or temporary buffers for incoming and outgoing traffic.

A dynamically updateable set of one or more WorkFlows (WorkFlow$_1$ 518→WorkFlow$_d$ 520 in the diagram) remove incoming traffic from an intermediate or temporary Incoming Queue ($IQ_1$ 512→$IQ_b$ 514 in the diagram), perform all of the required processing operations, and deposit processed artifacts on an intermediate or temporary Outgoing Queue ($OQ_1$ 524→$OQ_c$ 526 in the diagram). The WorkFlow component will be described more fully below.

The Database 522 that is depicted in FIG. 5 is a logical representation of the possibly multiple physical repositories that may be implemented to support, inter alia, configuration, profile, monitoring, alerting, etc. information. The physical repositories may be implemented through any combination of conventional Relational Database Management Systems (RDBMSs) such as Oracle, through Object Database Management Systems (ODBMSs), through in-memory Database Management Systems (DBMSs), or through any other equivalent facilities.

An Administrator 528 that is depicted in FIG. 5 provides management or administrative control over all of the different components of an AS 502 through, as one example, a WWW-based interface 530. It will be readily apparent to one of ordinary skill in the relevant art that numerous other interfaces (e.g., a data feed, an Application Programming Interface [API], etc.) are easily possible.

Through flexible, extensible, and dynamically updatable configuration information a WorkFlow component may be quickly and easily realized to support any number of activities. For example, WorkFlows might be configured to support a registration process; to support interactions with external entities; to support various internal processing steps (as described above) including, possibly inter alia, (1) the analysis of received content requests, (2) the identification of desired content, (3) the retrieval and processing (e.g., formatting, image rendering, etc.) of desired content, and (4) the generation and dispatch of delivery messages; to support the generation and dispatch of confirmation, follow-up, etc. messages; to support various billing transactions; to support the generation of scheduled and/or on-demand reports; etc. The specific WorkFlows that were just described are exemplary only; it will be readily apparent to one of ordinary skill in the relevant art that numerous other WorkFlow arrangements, alternatives, etc. are easily possible.

A SP may maintain a repository (e.g., a database) into which selected details of all administrative, messaging, etc. activities may be recorded. Among other things, such a repository may be used to support:

1) Scheduled (e.g., daily, weekly, etc.) and/or on-demand reporting with report results delivered through SMS, MMS, etc. messages; through E-Mail; through a WWW-based facility; etc.

2) Scheduled and/or on-demand data mining initiatives (possibly leveraging or otherwise incorporating one or more external data sources) with the results of same presented through Geographic Information Systems (GISs), visualization, etc. facilities and delivered through SMS, MMS, etc. messages; through E-Mail; through a WWW-based facility; etc.

It is important to note that while aspects of the discussion that was presented above referenced the use of TNs, SCs, etc. it will be readily apparent to one of ordinary skill in the relevant art that other message address identifiers are equally applicable and, indeed, are fully within the scope of the present invention.

The discussion that was just presented referenced several specific messaging paradigms including E-Mail, SMS/MMS/etc., and IM. These paradigms potentially offer an incremental advantage over other paradigms in that native support may be commonly found on a WD that a potential MS would be carrying. However, it is to be understood that it would be readily apparent to one of ordinary skill in the relevant art that numerous other paradigms (such as, for example, Internet Protocol [IP] Multimedia Subsystem [IMS], Wireless Application Protocol [WAP], etc.) are easily possible and, indeed, are fully within the scope of the present invention.

It is important to note that the hypothetical example that was presented above, which was described in the narrative and which was illustrated in the accompanying figures, is exemplary only. It is not intended to be exhaustive or to limit the invention to the specific forms disclosed. It will be readily apparent to one of ordinary skill in the relevant art that numerous alternatives to the presented example are easily possible and, indeed, are fully within the scope of the present invention.

The following list defines acronyms as used in this disclosure.

| Acronym | Meaning |
| --- | --- |
| API | Application Programming Interface |
| AS | Application Server |
| BI | Billing Interface |
| CSC | Common Short Code |
| DBMS | Database Management System |

-continued

| Acronym | Meaning |
| --- | --- |
| E-Mail | Electronic Mail |
| GIS | Geographic Information System |
| GPS | Global Positioning System |
| GW | Gateway |
| IM | Instant Messaging |
| IMS | IP Multimedia Subsystem |
| IP | Internet Protocol |
| IQ | Incoming Queue |
| IVR | Interactive Voice Response |
| LBS | Location-Based Service |
| MICV | Messaging Inter-Carrier Vendor |
| MMS | Multimedia Message Service |
| MS | Mobile Subscriber |
| ODBMS | Object Database Management System |
| ODP | On-Device Portal |
| OQ | Outgoing Queue |
| PC | Personal Computer |
| RDBMS | Relational Database Management System |
| SC | Short Code |
| SMS | Short Message Service |
| SP | Service Provider |
| TN | Telephone Number |
| WAP | Wireless Application Protocol |
| WC | Wireless Carrier |
| WD | Wireless Device |
| WF | Workflow |
| WS | Web Server |
| WWW | World-Wide Web |

What is claimed is:

1. A method for content delivery, comprising:
   receiving a content request from a wireless device associated with a mobile subscriber, wherein said content request is a Short Message Service (SMS) message containing at least a content identifier;
   performing one or more processing steps, including:
   (a) retrieving content based on at least aspects of said content identifier yielding retrieved content, said retrieved content being written in a language that requires display of double-byte characters within native SMS facilities of the wireless device,
   (b) determining that the native SMS facilities of the wireless device are unable to display double-byte characters,
   (c) selecting Multimedia Message Service (MMS) message facilities as an alternative content delivery channel for at least the portion of said retrieved content including the double-byte characters,
   (d) altering at least the layout and organization of said retrieved content yielding altered content, wherein said altering includes rendering the double-byte characters of said retrieved content as one or more images suitable for use in a MMS message; and
   sending to said mobile subscriber one or more MMS messages containing the one or more images of the double-byte characters.

2. The method of claim 1, wherein said content identifier is a URL.

3. The method of claim 1, wherein said processing steps include resolution of a link or a reference in said retrieved content.

4. The method of claim 1, wherein said processing steps include a billing transaction.

5. The method of claim 1, wherein said processing steps include the tracking of content requests by said mobile subscriber.

6. The method of claim 1, wherein said processing steps employ information previously supplied by said mobile subscriber.

7. The method of claim 6, wherein said information is defined by said mobile subscriber during a registration process.

8. The method of claim 7, wherein said information includes at least one of Identifying Information, Personal Information, and Billing Information.

9. The method of claim 7, wherein said information is preserved through a User Profile.

10. The method of claim 7, wherein said registration process is Web-based.

11. The method of claim 7, wherein said registration process includes a billing component.

12. The method of claim 1, wherein said processing steps suggest additional content to said mobile subscriber based on at least said content identifier and aspects of information previously supplied by said mobile subscriber.

13. The method of claim 1, wherein said processing steps augment said retrieved content with additional content based on at least said content identifier and aspects of information previously supplied by said mobile subscriber.

14. The method of claim 1, further comprising:
receiving from said mobile subscriber at least one reply message.

15. The method of claim 1, further comprising:
sending to said mobile subscriber at least one follow-up message.

16. The method of claim 15, wherein said follow-up message is one of an E-Mail message, a SMS message, a MMS message, or an IM message.

17. A system for content delivery, comprising:
a gateway at which an incoming Short Message Service (SMS) message is received, said incoming SMS message containing at least a content identifier, said incoming SMS message having been originally initiated as a wireless message from a wireless device; and
workflow modules, said workflow modules being configured to:
(a) extract one or more data elements from said incoming SMS message yielding extracted data elements;
(b) retrieve content based on at least aspects of said extracted data elements yielding retrieved content, said retrieved content being written in a language that requires double-byte characters;
(c) determine that the native SMS facilities of the wireless device are unable to display double-byte characters,
(d) select Multimedia Message Service (MMS) message facilities as an alternative content delivery channel for at least the portion of said retrieved content including the double-byte characters,
(e) alter at least the layout and organization of said retrieved content yielding altered content wherein said workflow module is configured to alter said retrieved content by rendering the double-byte characters of said retrieved content as one or more images suitable for use in a MMS message; and
(f) generate one or more outgoing MMS messages, said outgoing MMS messages containing at least the one or more images of the double-byte characters.

18. The system of claim 17, wherein said content identifier is a URL.

19. The system of claim 17, wherein said workflow modules resolve a link or a reference in said retrieved content.

20. The system of claim 17, wherein said workflow modules complete a billing transaction.

21. The system of claim 17, wherein said workflow modules track content requests by said mobile subscriber.

22. The system of claim 17, wherein said workflow modules employ information previously supplied by said mobile subscriber.

23. The system of claim 22, wherein said information is defined by said mobile subscriber during a registration process.

24. The system of claim 23, wherein said information includes at least one of Identifying Information, Personal Information, and Billing Information.

25. The system of claim 23, wherein said information is preserved through a User Profile.

26. The system of claim 23, wherein said registration process is Web-based.

27. The system of claim 23, wherein said registration process includes a billing component.

28. The system of claim 17, wherein said workflow modules suggest additional content to said mobile subscriber based on at least said content identifier and aspects of information previously supplied by said mobile subscriber.

29. The system of claim 17, wherein said workflow modules augment said retrieved content with additional content based on at least said content identifier and aspects of information previously supplied by said mobile subscriber.

* * * * *